US012669969B2

(12) United States Patent
Goto et al.

(10) Patent No.: US 12,669,969 B2
(45) Date of Patent: Jun. 30, 2026

(54) REAL MACHINE DIAGNOSTIC AND SYSTEMS

(71) Applicant: KOBELCO CONSTRUCTION MACHINERY CO., LTD., Hiroshima (JP)

(72) Inventors: Naoki Goto, Hiroshima (JP); Mitsunori Hirozawa, Hiroshima (JP); Taira Iji, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 300 days.

(21) Appl. No.: 18/571,399

(22) PCT Filed: Mar. 30, 2022

(86) PCT No.: PCT/JP2022/016056
§ 371 (c)(1),
(2) Date: Dec. 18, 2023

(87) PCT Pub. No.: WO2023/286395
PCT Pub. Date: Jan. 19, 2023

(65) Prior Publication Data
US 2024/0354039 A1 Oct. 24, 2024

(30) Foreign Application Priority Data

Jul. 13, 2021 (JP) ................................. 2021-115702

(51) Int. Cl.
*G06F 3/14* (2006.01)
*E02F 9/26* (2006.01)
(Continued)

(52) U.S. Cl.
CPC ................ *G06F 3/14* (2013.01); *E02F 9/267* (2013.01); *G06F 3/0482* (2013.01); *G07C 5/008* (2013.01); *G08C 17/02* (2013.01)

(58) Field of Classification Search
CPC .......... G06F 3/14; G06F 3/0482; E02F 9/267; G07C 5/008; G08C 17/02
See application file for complete search history.

(56) References Cited

U.S. PATENT DOCUMENTS 6,522,964 B1    2/2003  Miki et al.
7,684,917 B2 *  3/2010  Furuno ..................... E02F 9/26
                                                                    700/83
(Continued)

FOREIGN PATENT DOCUMENTS

JP          H06-11419 A      1/1994
JP          H11-158940 A     6/1999
(Continued)

OTHER PUBLICATIONS

The extended European search report dated Oct. 1, 2024 issued in the corresponding EP Patent Application No. 22841743.2.

*Primary Examiner* — Andrea C Leggett
(74) *Attorney, Agent, or Firm* — Carrier, Shende & Associates P.C.; Joseph P. Carrier; Jeffrey T. Gedeon

(57) ABSTRACT

A system, and the like, capable of improving user-friendliness when a work machine is diagnosed in a form intended by a user using a terminal device having a wireless communication function, are provided. A second external request signal based on a designated attribute regarding a designated work machine 200 designated through a terminal input interface 101 and a unique identifier read in non-contact manner from a designated component 222 with a non-contact sensor mounted on a terminal device 100 is transmitted to a real machine communication station 210 mounted on the designated work machine 200. Then, a second external response signal representing information regarding the designated component 222 in response to the second external request signal is transmitted from the real machine communication station 210 to the terminal device (Continued)

100, and the information that is a diagnostic result of the designated component is output to a terminal output interface 102.

6 Claims, 7 Drawing Sheets

(51) Int. Cl.
    *G06F 3/0482*       (2013.01)
    *G07C 5/00*         (2006.01)
    *G08C 17/02*       (2006.01)

(56)       References Cited

U.S. PATENT DOCUMENTS

| | | | |
|---|---|---|---|
| 9,988,794 | B2 | 6/2018 | Miura et al. |
| 2008/0270074 | A1 | 10/2008 | Horkavi et al. |

| | | | | |
|---|---|---|---|---|
| 2009/0005928 | A1* | 1/2009 | Sells | G07C 5/0808 |
| | | | | 701/31.7 |
| 2014/0224888 | A1 | 8/2014 | Bomer et al. | |
| 2019/0003155 | A1* | 1/2019 | Kurogi | B60R 1/28 |
| 2021/0317639 | A1 | 10/2021 | Akiyama et al. | |
| 2022/0251806 | A1* | 8/2022 | Otoh | E02F 9/261 |
| 2023/0419208 | A1* | 12/2023 | Wulf | G05B 13/0265 |

FOREIGN PATENT DOCUMENTS

| | | | |
|---|---|---|---|
| JP | 2005-308436 | A | 11/2005 |
| JP | 2006-201851 | A | 8/2006 |
| JP | 2010-198158 | A | 9/2010 |
| JP | 2010-198159 | A | 9/2010 |
| JP | 2015-138465 | A | 7/2015 |
| JP | 2016-070004 | A | 5/2016 |
| JP | 2020-056180 | A | 4/2020 |
| WO | 2014/122869 | A1 | 8/2014 |
| WO | 2021/085608 | A1 | 5/2021 |

* cited by examiner

REAL MACHINE DIAGNOSTIC AND SYSTEMS

TECHNICAL FIELD

The present invention relates to a technique for diagnosing a situation of a component part such as a power source of a work machine through wireless communication between equipment mounted on the work machine and other equipment.

BACKGROUND ART

A technique for diagnosing a state of a work machine through wireless communication has been proposed (see, for example, Patent Literatures 1 and 2).

CITATION LIST

Patent Literature

Patent Literature 1: Japanese Patent Laid-Open No. 2010-198158
Patent Literature 2: Japanese Patent Laid-Open No. 2010-198159

SUMMARY OF INVENTION

Technical Problem

However, communication between a terminal device and a real machine communication station is established, and thus, if the real machine communication station is mounted on a work machine that is not intended to be diagnosed by a user, and a diagnostic result of the work machine is provided to the user, usefulness of the diagnostic result is low, and there is a possibility that the provision of the diagnostic result may give the user a feeling of troublesomeness.

The present invention is therefore directed to providing a system, and the like, capable of improving user-friendliness when a work machine is diagnosed using a terminal device having a wireless communication function in a form intended by a user.

Solution to Problem

A real machine diagnostic system of the present invention includes
    a first functional element, and
    a second functional element,
    the second functional element causes a terminal device to
        transmit an external request signal based on a designated attribute regarding a designated work machine designated through an input interface of the terminal device and a unique identifier read in a non-contact manner from a designated component mounted on the designated work machine with a non-contact sensor mounted on the terminal device to a real machine communication station mounted on the designated work machine, and causes the terminal device to receive from the real machine communication station an external response signal representing an application result of control characteristics regarding the designated component in response to the external request signal, and the first functional element causes the application result of the control characteristics of the designated component represented by the external response signal received by the terminal device to be output to an output interface of the terminal device.

According to the real machine diagnostic system having the configuration, the external request signal based on the designated attribute regarding the designated work machine designated through the input interface of the terminal device and the unique identifier read in a non-contact manner from the designated component with the non-contact sensor mounted on the terminal device is transmitted to the real machine communication station mounted on the designated work machine. Further, the external response signal representing the application result of the control characteristics regarding the designated component in response to the external request signal is received from the real machine communication station, and the application result of the control characteristics of the designated component that is a diagnostic result of the designated component is output to the output interface of the terminal device.

This can improve user-friendliness when the application result of the control characteristics of the designated component that is information regarding the designated component mounted on the designated work machine is acquired as a diagnostic result of the designated work machine having a designated attribute in a form intended by a user.

DESCRIPTION OF EMBODIMENTS

Figure 1:
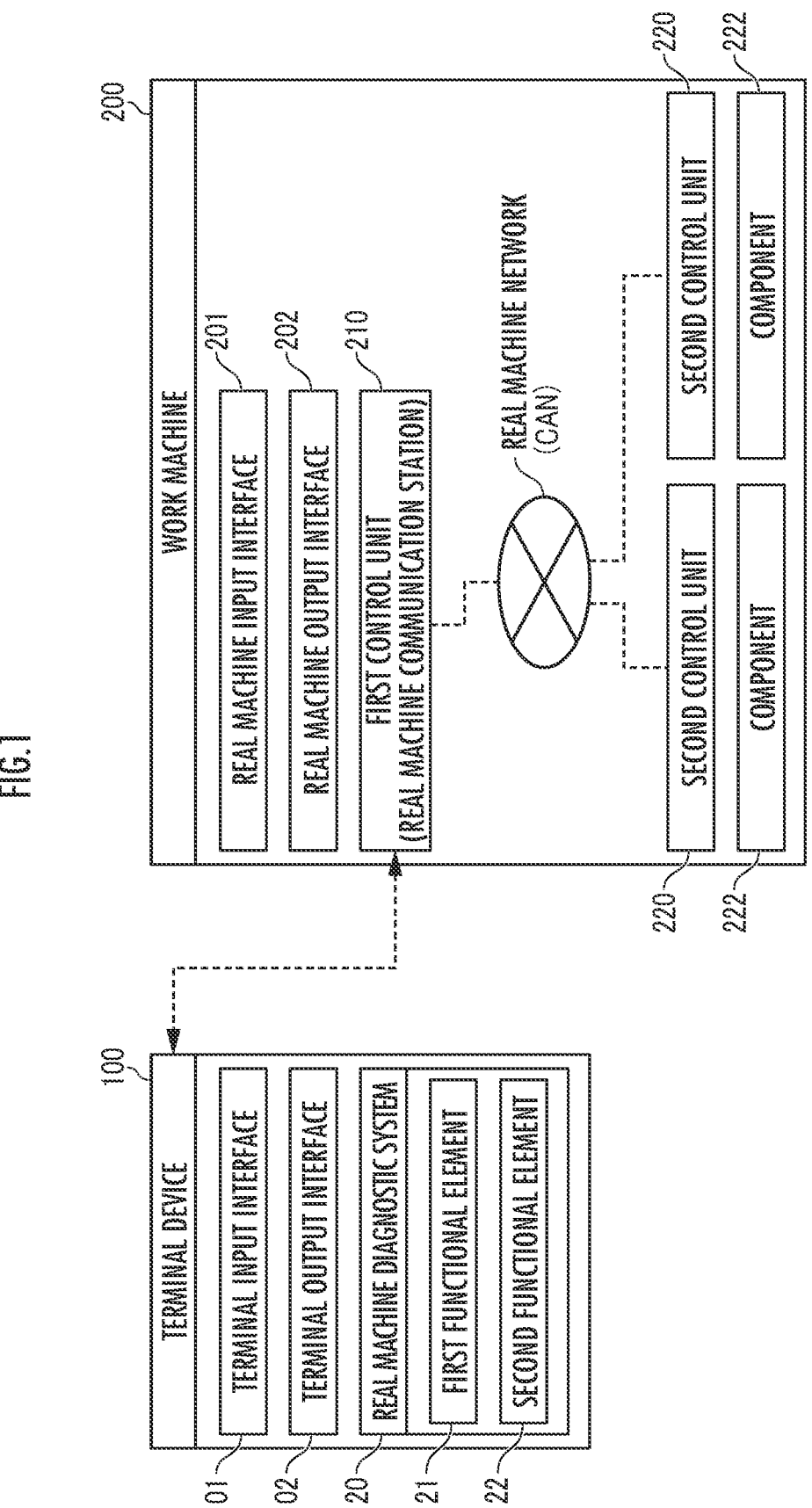
FIG. 1 is an explanatory diagram regarding a configuration of a real machine diagnostic system as one embodiment of the present invention.

A real machine diagnostic system 120 illustrated in FIG. 1 is mounted on a terminal device 100. The real machine diagnostic system 120 recognizes a diagnostic result of a component 222 such as an engine and an injector mounted on a work machine 200 on the basis of communication with a real machine communication station 210 mounted on the work machine 200.

Configuration of Terminal Device

The terminal device 100 includes a smartphone, a tablet terminal, a personal computer, a beacon, or the like. As illustrated in FIG. 1, the terminal device 100 includes a terminal input interface 101 and a terminal output interface 102. The terminal input interface 101 includes a capacitance type touch button constituting a touch panel. The terminal output interface 102 includes an acoustic output device in addition to an image display device constituting the touch panel.

Configuration of Real Machine Diagnostic System

The real machine diagnostic system 120 includes an arithmetic processing device (a single-core processor, a multicore processor or a processor core constituting this), a storage device (a memory such as a ROM and a RAM) and wireless communication equipment. The real machine diagnostic system 120 includes a first functional element 121 (external functional element) and a second functional element 122 (external functional element). As a result of the arithmetic processing device reading out software (application software) and data from the storage device and executing arithmetic processing on the data in accordance with the software, the first functional element 121 and the second functional element 122 exert respective functions.

Configuration of Work Machine

The work machine 200, which is, for example, a crawler excavator (construction machine), includes a crawler type base carrier, an upper revolving body, a revolving mechanism for revolving the upper revolving body with respect to the base carrier, and a work mechanism (work attachment) provided at a central front portion of the upper revolving body. The work machine 200 includes a real machine input interface 201, a real machine output interface 202, a first control unit 210, one or more second control units 220, and the component 222 such as an engine as a power source.

The real machine input interface 201 includes a real machine operation mechanism constituted with a plurality of operation levers positioned around a seat positioned inside a cab (operator room) provided in the upper revolving body. The real machine output interface 202 is positioned in the upper revolving body and includes an audio and image output device positioned inside the cab likewise for outputting an image acquired through an imaging device that captures an image backward of the upper revolving body and an alarm in accordance with an operating state of machine and/or a state of equipment.

The first control unit 210 constitutes an "real machine communication station" and includes an arithmetic processing device, a storage device and wireless communication equipment. The second control unit 220, which is a control unit for controlling operation of the component 222, includes the arithmetic processing device and the storage device. As a result of the arithmetic processing device reading out software (application software) and data from the storage device and executing arithmetic processing on the data in accordance with the software, the first control unit 210 and the second control unit 220 exert respective functions. The first control unit 210 and the second control unit 220 are connected so as to be able to perform communication with each other through a real machine communication network (for example, a CAN).

Functions of Real Machine Diagnostic System

Functions of the real machine diagnostic system 120 having the configuration illustrated in FIG. 1 will be described.

Communication Establishment Function

First, processing for establishing wireless communication (for example, WiFi ("WiFi" is registered trademark) or Bluetooth ("Bluetooth" is registered trademark)) between the terminal device 100 and the first control unit 210 (real machine communication station) is executed. Specifically, whether or not a communication station identifier is input through the terminal input interface 101 is determined by the first functional element 121. The communication station identifier is an identifier like an SSID for identifying the real machine communication station such as an access point of a wireless LAN. The communication station identifier includes, for example, a plurality of characters, numbers and/or symbols representing a serial number of the component 222 such as an engine and/or a battery that is mounted on the work machine 200 along with the real machine communication station.

In a case where the communication station identifier is not input, a series of processing ends. On the other hand, in a case where the communication station identifier is input, it is tried to perform communication with the real machine communication station identified by the communication station identifier.

To perform communication, the first functional element 121 generates an authenticator in accordance with a designation scheme on the basis of the communication station identifier. The authenticator may be generated in accordance with different designation schemes depending on a difference in data, characters, numbers or symbols constituting a designated portion of the communication station identifier.

The first functional element 121 causes the real machine communication station identified by the communication station identifier to establish wireless communication using the generated authenticator.

First Diagnostic Processing Function

Figure 2:
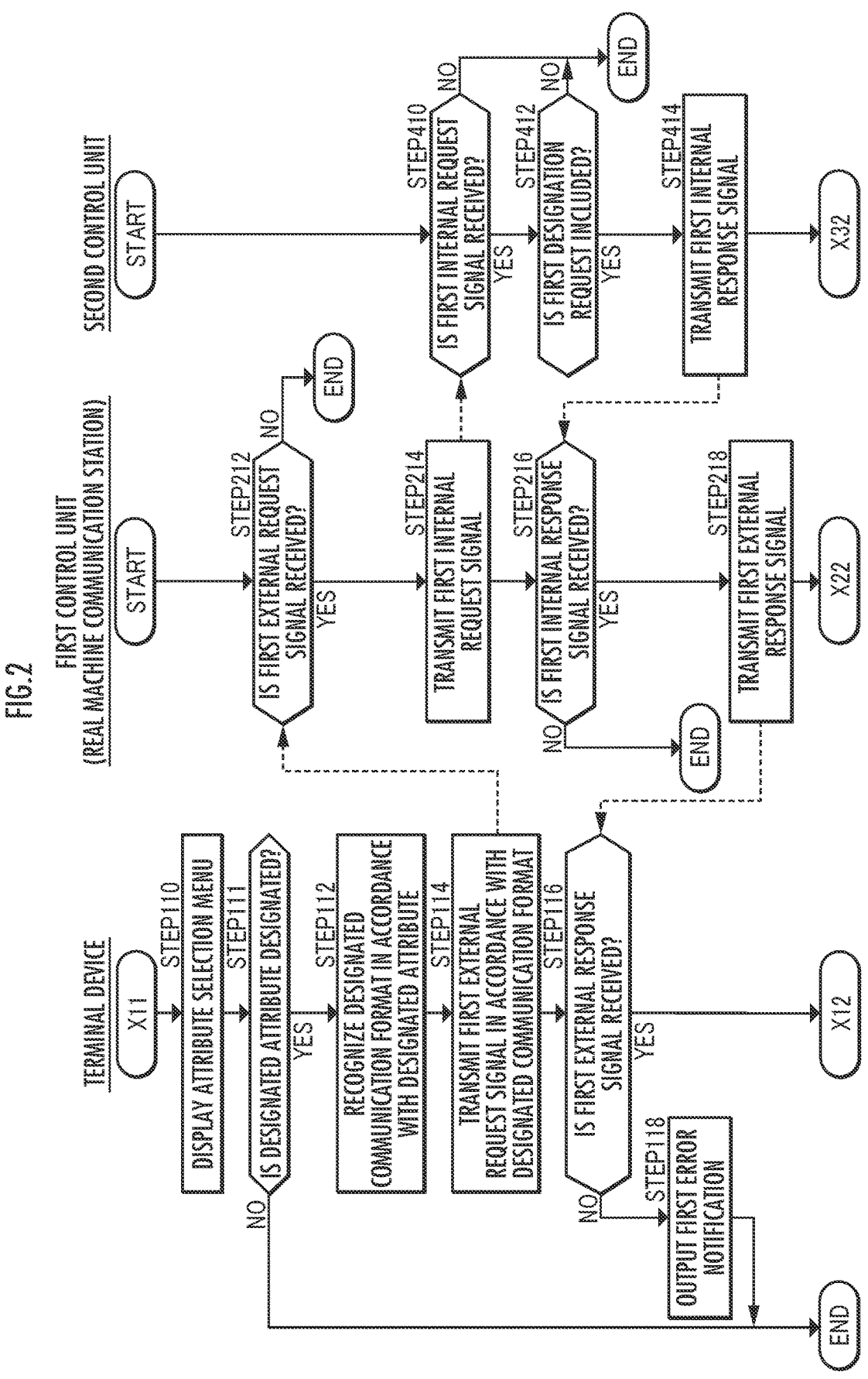
FIG. 2 is an explanatory diagram regarding a first diagnostic processing function of the real machine diagnostic system.

Specifically, the first functional element 121 outputs an attribute selection menu for selecting or designating a designated attribute regarding a designated attribute item of the work machine 200 to the terminal output interface 102 (FIG. 2/STEP 110). In the present embodiment, a plurality of attribute selection menus for indirectly or directly designating designated attributes respectively regarding a plurality of designated attribute items are output to the terminal output interface 102 at the same time or sequentially. Instead of the plurality of designated attribute items, a designated attribute regarding a single designated attribute item may be designated. Instead of all of the plurality of designated attribute items, attribute selection menus for part of the plurality of designated attribute items may be output to the terminal output interface 102.

Figure 3:
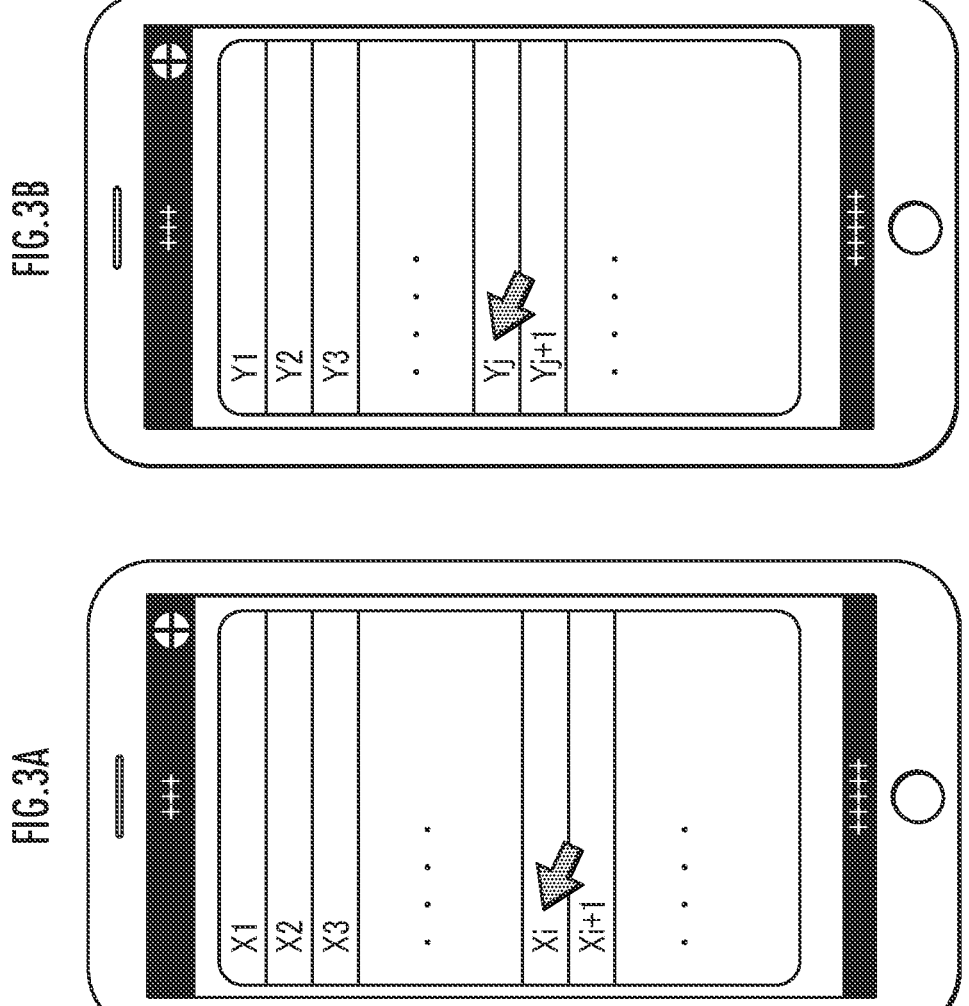
FIG. 3A is an explanatory diagram regarding one attribute selection menu screen.
FIG. 3B is an explanatory diagram regarding another attribute selection menu screen.

By this means, for example, as illustrated in FIG. 3A, a screen indicating one attribute selection menu including attributes (X1, X2, . . . Xn) regarding one attribute item X="a model of the engine or a type of the work machine 200" as options is output to the terminal output interface 102. Further, as illustrated in FIG. 3B, a screen indicating another attribute selection menu including attributes (Y1, Y2, . . . Ym) regarding another attribute item Y="a region or country in which the work machine 200 is located or an environmental rule applied in the country or region" as options is output to the terminal output interface 102.

One designated attribute item X="a model of the engine or a type of the work machine 200" corresponds to an "internal cause attribute item" regarding an internal situation of the work machine 200. A manufacturer or country of manufacture of the work machine 200, a type, a model and/or specifications of the work machine 200 or the component 222, use history of the work machine 200, exchange history of the component 222, and the like, correspond to the internal cause attribute items. Another designated attribute item Y="the region or country in which the work machine 200 is located or the environmental rule applied in the country or region" corresponds to an "external cause attribute item" regarding an external situation of the work machine 200. The region or country in which the work machine 200 is located and/or weather, law, culture, society, economic circumstances, and the like, specific to the region or country correspond to the external cause attribute items.

The designated attribute item may include not both but one of the external cause attribute item or the internal cause attribute item.

The designated attribute item may be determined among the components 222 of the work machine 200 in accordance with a first designated component designated through the terminal input interface 101.

The first functional element 121 determines whether or not the designated attribute is selected or designated through the terminal input interface 101 in accordance with the attribute selection menu within a designated period since output of the attribute selection menu (FIG. 2/STEP 111). Output of the attribute selection menu may be omitted, and part or all of the designated attributes may be directly input to a designation window output to the terminal output interface 102 using characters, numbers or symbols with a keypad constituting the terminal input interface 101.

In a case where the determination result is negative (FIG. 2/STEP 111: No), a series of processing ends. On the other hand, in a case where the determination result is affirmative (FIG. 2/STEP 111: Yes), the second functional element 122 recognizes a designated communication format in accordance with the designated attributes (Xi, Yj) (FIG. 2/STEP 112). The second functional element 122 causes the terminal device 100 to transmit a first external request signal to the first control unit 210 that is the real machine communication station with which wireless communication is established in accordance with the designated communication format (FIG. 2/STEP 114). The first external request signal includes a "first designation request" regarding confirmation of a communication state of the real machine communication network. This is a request for confirming whether or not information regarding the first designated component of the work machine 200 in accordance with the designated attributes (Xi, Yj) can be acquired.

The first control unit 210 (real machine communication station) determines whether or not the first external request signal is received (FIG. 2/STEP 212). In a case where the determination result is negative (FIG. 2/STEP 212: No), a series of processing ends. On the other hand, in a case where the determination result is affirmative (FIG. 2/STEP 212: Yes), the first control unit 210 generates a first internal request signal by converting a format of the first external request signal into a format for communication in the real machine communication network. After that, the first control unit 210 transmits the first external request signal to the second control unit 220 through the real machine communication network (FIG. 2/STEP 214). The first internal request signal is generated so as to include part of data (such as, for example, identification data of the second control unit 220 and/or instruction data to the second control unit 220) included in the first external request signal in a format in which data except the part of data is changed.

The second control unit 220 determines whether or not the first internal request signal is received (FIG. 2/STEP 410). In a case where the determination result is negative (FIG. 2/STEP 410: No), a series of processing ends. On the other hand, in a case where the determination result is affirmative (FIG. 2/STEP 410: Yes), the second control unit 220 further determines whether or not the first internal request signal includes the first designation request (FIG. 2/STEP 412). For example, the "first designation request" includes a request for reading information (such as a serial number and a model) regarding the component 222 for which operation is controlled by the second control unit 220.

In a case where the determination result is negative (FIG. 2/STEP 412: No), a series of processing ends. On the other hand, in a case where the determination result is affirmative (FIG. 2/STEP 412: Yes), the second control unit 220 transmits a first internal response signal including a first designation response in response to the first designation request included in the first internal request signal to the first control unit 210 through the real machine communication network (FIG. 2/STEP 414). For example, the "first designation response" includes information (such as a serial number and a model) regarding the component 222 read by the second control unit 220.

The first control unit 210 determines whether or not the first internal response signal is received (FIG. 2/STEP 216). In a case where the determination result is negative (FIG. 2/STEP 216: No), a series of processing ends. On the other hand, in a case where the determination result is affirmative (FIG. 2/STEP 216: Yes), the first control unit 210 generates a first external response signal by converting a format of the first internal response signal into a format for wireless communication with the terminal device 100. After that, the first control unit 210 transmits the first external response signal to the terminal device 100 through the real machine communication network (FIG. 2/STEP 218).

The second functional element 122 determines whether or not the terminal device 100 receives the first external response signal including the first designation response (or whether or not the first external response signal received by the terminal device 100 includes the first designation response) (FIG. 2/STEP 116). In a case where the determination result is negative (FIG. 2/STEP 116: No), the second functional element 122 outputs a first error notification indicating that communication between the first control unit 210 and the second control unit 220 through the real machine communication network of the work machine 200 ends in failure to the terminal output interface 102 (FIG. 2/STEP 118), and a series of processing ends. On the other hand, in a case where the determination result is affirmative (FIG. 2/STEP 116: Yes), second diagnostic processing is performed in accordance with a flowchart indicated in FIG. 4.

Second Diagnostic Processing Function

Figure 4:
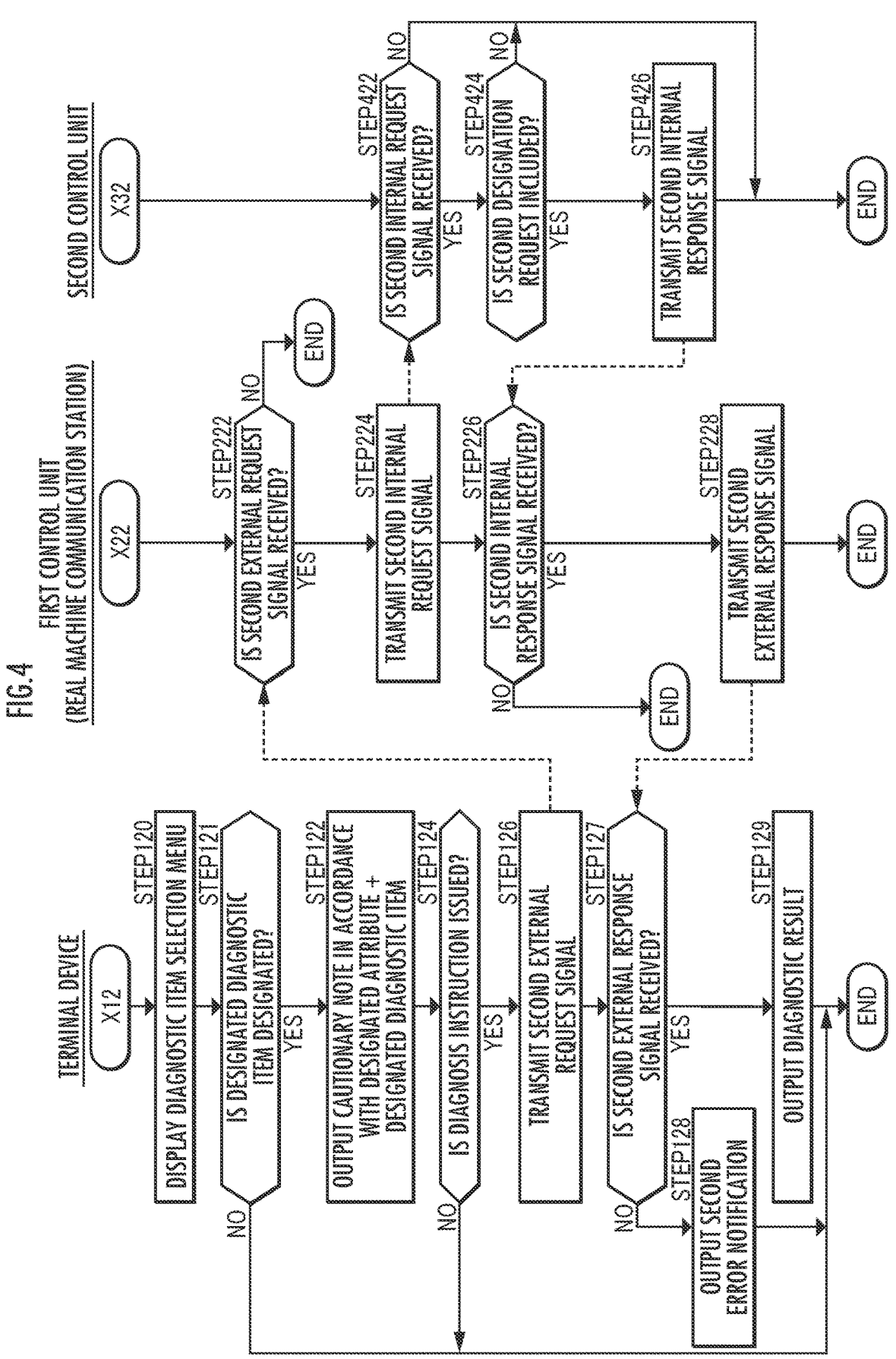
FIG. 4 is an explanatory diagram regarding a second diagnostic processing function of the real machine diagnostic system.
Figure 5:
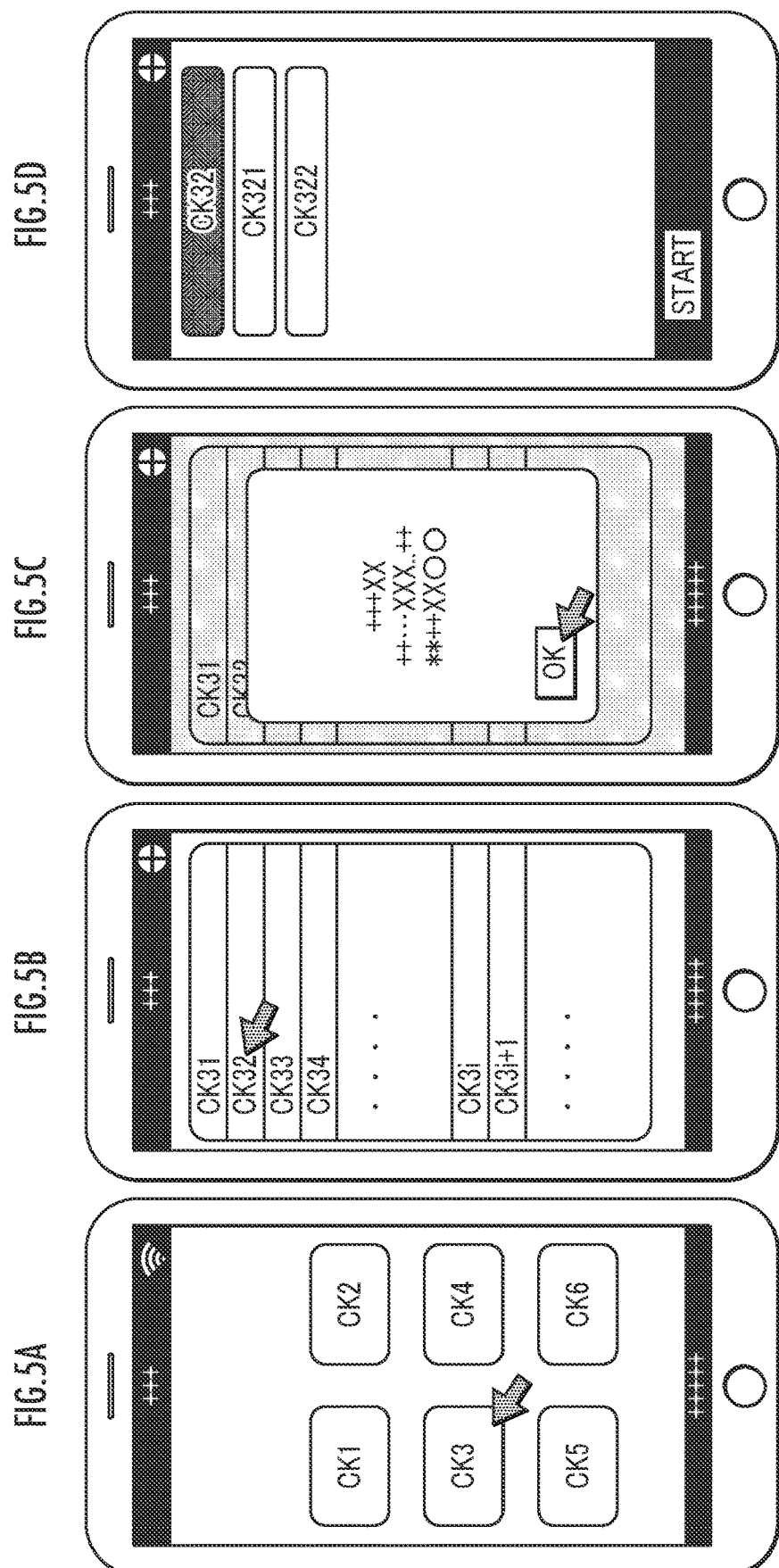
FIG. 5A is an explanatory diagram regarding one diagnostic item selection menu screen.
FIG. 5B is an explanatory diagram regarding another diagnostic item selection menu screen.
FIG. 5C is an explanatory diagram regarding a cautionary note screen.
FIG. 5D is an explanatory diagram regarding a diagnosis instruction screen.

Specifically, the first functional element 121 outputs a diagnostic item selection menu for selecting a diagnostic item of the work machine 200 to the terminal output interface 102 (FIG. 4/STEP 120). By this means, for example, as illustrated in FIG. 5A, a primary diagnostic item selection menu of large categories CK1, CK2, . . . for diagnosis (The component 222 to be diagnosed may be designated by each large category.) is output to the terminal output interface 102.

The first functional element 121 determines whether or not a designated diagnostic item is selected or designated through the terminal input interface 101 in accordance with the diagnostic item selection menu within a designated period since output of the diagnostic item selection menu (FIG. 4/STEP 121). For example, in a case where the large category CK3 is selected from the primary diagnostic item selection menu by touch operation through the terminal input interface 101, as illustrated in FIG. 5B, a secondary diagnostic selection menu of small categories CK31, CK32, . . . for diagnosis regarding the large category CK3 is output to the terminal output interface 102. Then, for example, the small category CK32 is selected from the secondary diagnostic item selection menu as the designated diagnostic item by touch operation through the terminal input interface 101. Output of the diagnostic item selection menu may be omitted, and the designated diagnostic item may be directly input using a keypad constituting the terminal input interface 101.

In a case where the determination result is negative (FIG. 4/STEP 121: No), a series of processing ends. On the other hand, in a case where the determination result is affirmative (FIG. 4/STEP 121: Yes), the second functional element 122 outputs cautionary note in accordance with the designated attributes (Xi, Yj) and the designated diagnostic item to the terminal output interface 102 (FIG. 4/STEP 122). By this means, for example, as illustrated in FIG. 5C, the cautionary note is indicated in a window displayed on a screen on which the secondary diagnostic item selection menu is output. For example, the "cautionary note" includes explanation that a switch and/or a real machine operation lever constituting the real machine input interface 201 needs to be designated, and that values of meters constituting the real machine output interface 202 fall within a designated range in order to obtain a diagnostic result for the designated diagnostic item.

Subsequently, the second functional element 122 determines whether or not a diagnosis instruction is issued through the terminal input interface 101 within a designated period since output of the diagnostic item selection menu or the cautionary note (FIG. 4/STEP 124). For example, by an OK button illustrated in FIG. 5C being subjected to touch operation, the window is closed, and then, a screen including a START button is output to the terminal output interface 102 as illustrated in FIG. 5D immediately or after designated operation is performed. This screen includes windows CK321 and CK322 indicating diagnostic index values included in the designated diagnostic item CK32. The determination processing is executed in accordance with whether or not this START button is subjected to tap operation.

In a case where the determination result is negative (FIG. 4/STEP 124: No), a series of processing ends. On the other hand, in a case where the determination result is affirmative (FIG. 4/STEP 124: Yes), the second functional element 122 causes the terminal device 100 to transmit a second external request signal to the first control unit 210 that is the real machine communication station with which wireless communication is established, in accordance with the designated communication format in accordance with the designated attributes (Xi, Yj) (FIG. 4/STEP 126). The second external request signal includes a second designation request regarding provision of information regarding the designated diagnostic item for a second component of the work machine 200.

The first control unit 210 (real machine communication station) determines whether or not the second external request signal is received (FIG. 4/STEP 222). In a case where the determination result is negative (FIG. 4/STEP 222: No), a series of processing ends. On the other hand, in a case where the determination result is affirmative (FIG. 4/STEP 222: Yes), the first control unit 210 generates a second internal request signal by converting a format of the second external request signal into a format for communication in the real machine communication network. After that, the first control unit 210 transmits the second external request signal to the second control unit 220 through the real machine communication network (FIG. 4/STEP 224).

The second control unit 220 determines whether or not the second internal request signal is received (FIG. 4/STEP 422). In a case where the determination result is negative (FIG. 4/STEP 422: No), a series of processing ends. On the other hand, in a case where the determination result is affirmative (FIG. 4/STEP 422: Yes), the second control unit 220 further determines whether or not the second internal request signal includes a second designation request (FIG. 4/STEP 424). For example, the "second designation request" includes a request for a diagnostic result of the component 222 for which operation is controlled by the second control unit 220.

In a case where the determination result is negative (FIG. 4/STEP 424: No), a series of processing ends. On the other hand, in a case where the determination result is affirmative (FIG. 4/STEP 424: Yes), the second control unit 220 transmits a second internal response signal including a second designation response in response to the second designation request included in the second internal request signal to the first control unit 210 through the real machine communication network (FIG. 4/STEP 426). For example, the "second designation response" includes diagnostic results representing states of the components 222 detected through a designated sensor by the second control unit 220.

The first control unit 210 determines whether or not the second internal response signal is received (FIG. 4/STEP 226). In a case where the determination result is negative (FIG. 4/STEP 226: No), a series of processing ends. On the other hand, in a case where the determination result is affirmative (FIG. 4/STEP 226: Yes), the first control unit 210 generates a second external response signal by converting a format of the second internal response signal into a format for wireless communication with the terminal device 100. After that, the first control unit 210 transmits the second external response signal to the terminal device 100 through the real machine communication network (FIG. 4/STEP 228).

The second functional element 122 determines whether or not the terminal device 100 receives the second external response signal including the second designation response (or whether or not the second external response signal received by the terminal device 100 includes the second designation response) (FIG. 4/STEP 127). In a case where the determination result is negative (FIG. 4/STEP 127: No), the second functional element 122 outputs a second error notification indicating that diagnosis of the component 222 (designated component) or acquisition of the diagnostic result ends in failure to the terminal output interface 102 (FIG. 4/STEP 128), and a series of processing ends. On the other hand, in a case where the determination result is affirmative (FIG. 4/STEP 127: Yes), the diagnostic result of the designated component among the components 222 is output to the terminal output interface 102 (FIG. 4/STEP 129), and a series of processing ends.

Operation and Effects

According to the real machine diagnostic system 120 as one embodiment of the present invention that exerts the functions, the first external request signal is transmitted from the terminal device 100 to the real machine communication station 210 for which wireless communication with the terminal device 100 is established in accordance with the designated communication format (see FIG. 2/STEP 114).

The "designated communication format" is determined in accordance with the designated attribute designated through the terminal input interface 101 for the designated attribute item regarding the work machine 200 (see FIG. 2/STEP 111→STEP 112). Further, the "designated communication format" is converted by the real machine communication station 210 into the real machine communication format for acquiring information regarding the designated component 222 (the first designated component) of the designated work machine 200 by utilizing communication in the real machine communication network.

Further, the first external response signal regarding the communication state of the real machine communication network in the designated work machine 200 on which the real machine communication station 210 is mounted is transmitted from the real machine communication station 210 to the terminal device 100 (see FIG. 2/STEP 212→STEP 214→STEP 410→STEP 412→STEP 414→STEP 216→STEP 218).

It is possible to confirm a situation where an abnormality occurs in the communication state in the real machine communication network mounted on the designated work machine 200, and eventually, a situation where it is difficult or impossible to acquire information regarding the designated component of the designated work machine 200 through communication by way of the real machine communication network on the basis of the external response signal received by the terminal device 100 or a reception situation of the external response signal. It is therefore possible to avoid a situation where acquisition of information regarding the designated component 222 (first designated component) as a diagnostic result of the designated work machine 200 using the terminal device 100 is tried despite such a situation, so that improvement of efficiency of the diagnostic processing can be achieved.

Further, cautionary note regarding the designated diagnostic item designated through the terminal input interface 101 is output to the terminal output interface 102 (see FIG. 4/STEP 121→STEP 122 and FIG. 5A to FIG. 5C). Further, the diagnostic result regarding the designated diagnostic item, that is, information regarding the designated component 222 (second designated component) of the designated work machine 200 is output to the terminal output interface 102 in accordance with confirmation of the cautionary note before diagnosis of the designated work machine 200 through the terminal input interface 101 (see FIG. 4/STEP 222→STEP 224→STEP 422→STEP 424→STEP 426→STEP 226→STEP 228→STEP 127→STEP 129).

This enables a user who sees the cautionary note through the terminal output interface 102 to take preliminary measures in advance in view of the designated diagnostic item of the designated work machine 200. This results in avoiding a situation where diagnosis of the designated diagnostic item of the designated work machine 200 is tried in a state where appropriate preliminary measures are not taken, and eventually, a situation where the trial ends in failure, so that improvement of diagnosis efficiency of the designated work machine 200 is achieved.

Other Embodiments of the Present Invention

Figure 6:
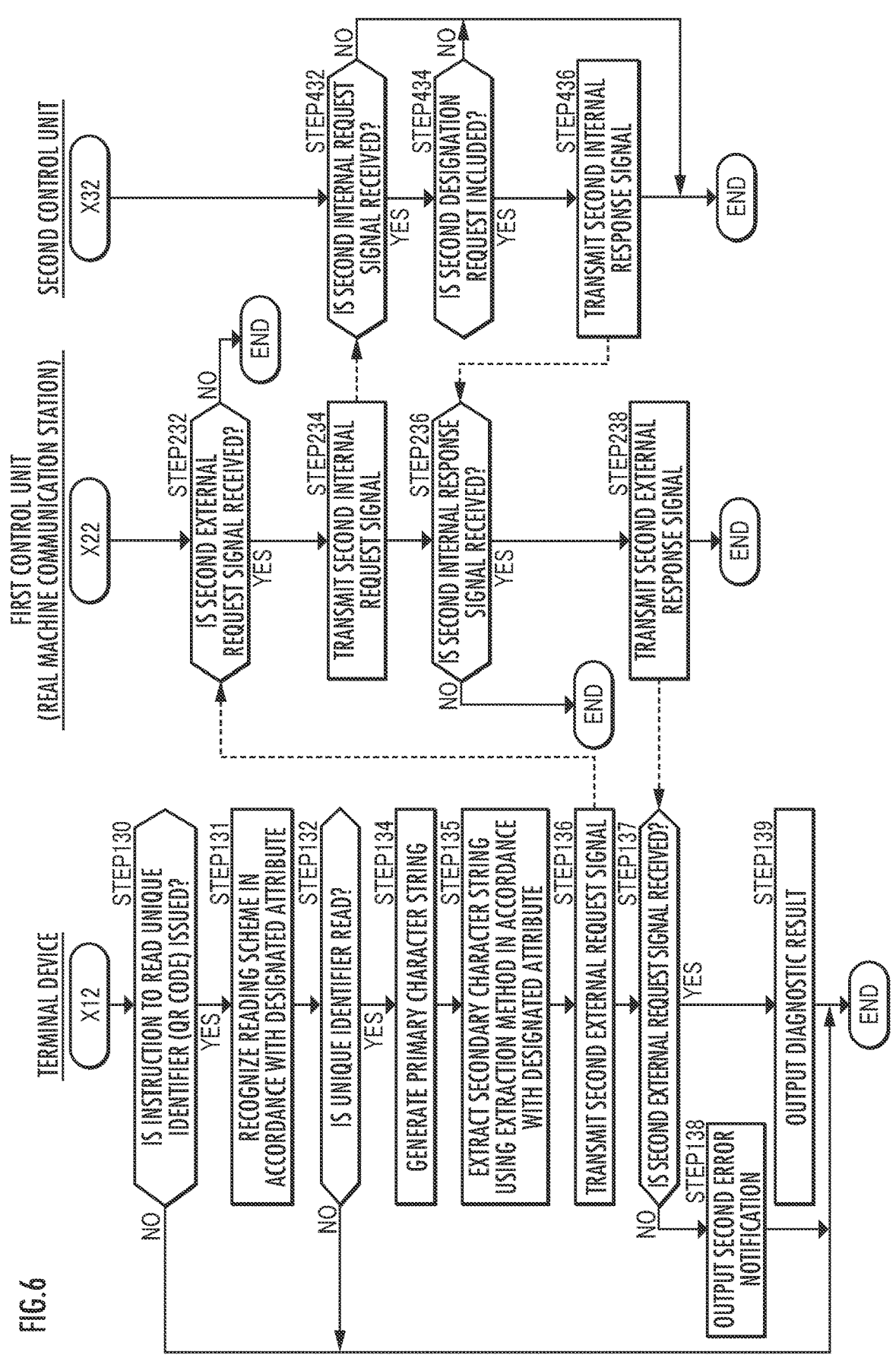
FIG. 6 is an explanatory diagram regarding another embodiment of the second diagnostic processing function.

In place of or in addition to the flowchart indicated in FIG. 4, processing in accordance with a flowchart indicated in FIG. 6 may be executed. Processing from STEP 130 to STEP 136 in the flowchart indicated in FIG. 6 is different from the processing from STEP 120 to STEP 126 in the flowchart indicated in FIG. 4. Other processing in the flowchart indicated in FIG. 6 is substantially similar to other processing in the flowchart indicated in FIG. 4.

Specifically, the second functional element 122 determines whether or not an instruction to read a unique identifier from a designated medium attached to the second designated component among the components 222 is issued (FIG. 6/STEP 130).

Figure 7A:
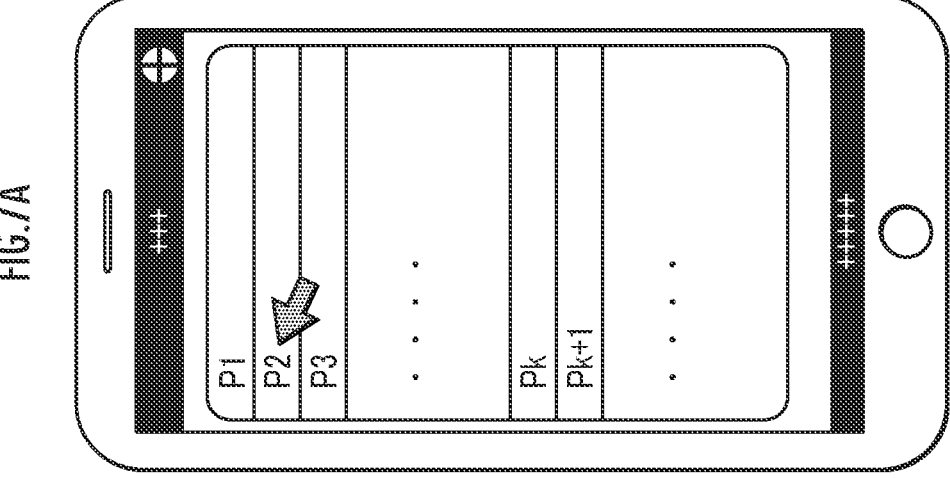
FIG. 7A is an explanatory diagram regarding a component designation screen.

For example, as illustrated in FIG. 7A, a screen indicating a selection menu including options P1, P2, . . . of the components 222 of the work machine 200 is output to the terminal output interface 102. As a result of the option P2 being selected from the selection menu, a component 222 (for example, a diesel particulate filter (DPF) attached to the injector or the engine) corresponding to the option P2 is selected as the second designated component.

Figure 7B:
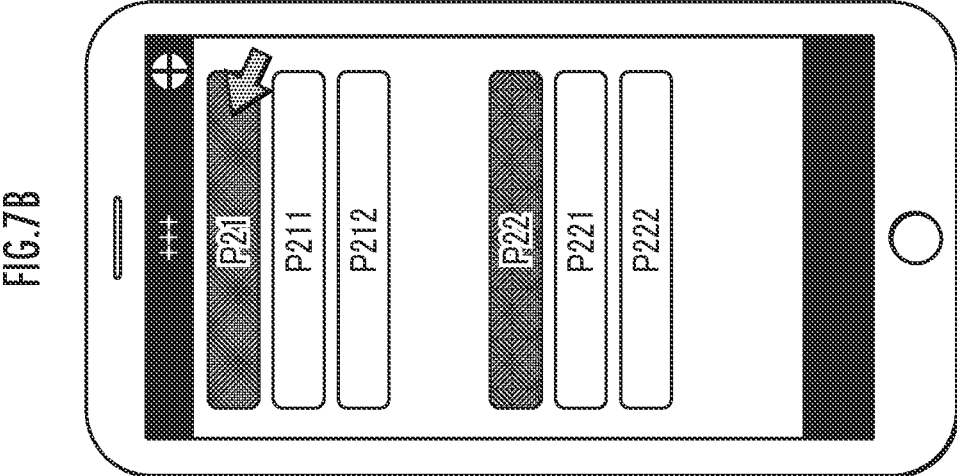
FIG. 7B is an explanatory diagram regarding a unique identifier input screen.

In accordance with this, for example, as illustrated in FIG. 7B, a screen indicating buttons representing components P21, P22, . . . of the second designated component, and a window for inputting identifiers or codes for specifying the respective components P21, P22, . . . is output to the terminal output interface 102. Whether or not an instruction to read a unique identifier from the designated medium is issued is determined in accordance with whether or not there is touch operation of the buttons representing the components P21, P22, . . . in this screen.

In a case where the determination result is negative (FIG. 6/STEP 130: No), a series of processing ends. On the other hand, in a case where the determination result is affirmative (FIG. 6/STEP 130: Yes), the second functional element 122 recognizes a reading scheme of a unique identifier in accordance with the designated attribute of the work machine 200 (FIG. 6/STEP 131).

Further, the second functional element 122 determines whether or not a unique identifier is read by a non-contact sensor mounted on the terminal device 100 (FIG. 6/STEP 132).

Figure 7C:
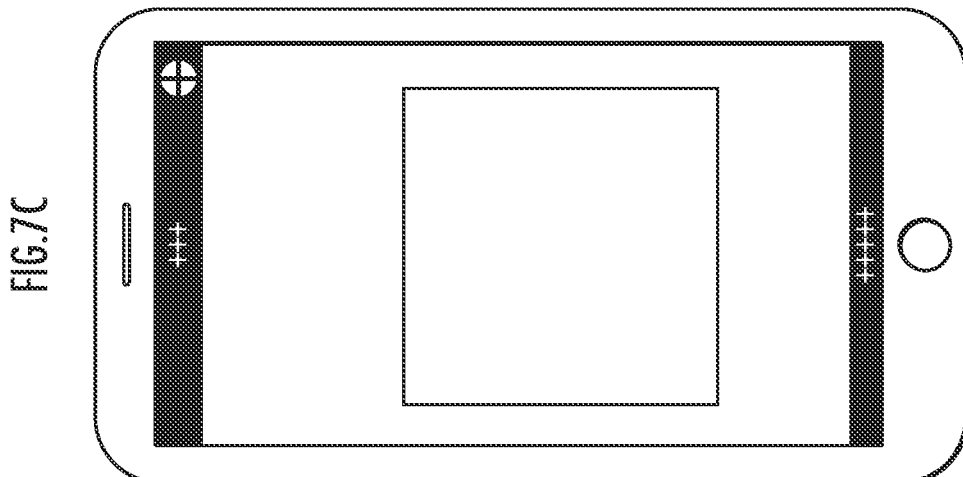
FIG. 7C is an explanatory diagram regarding a screen for reading a unique identifier.

For example, in a case where a button corresponding to the component P21 (for example, the injector that is one part of the engine) is subjected to touch operation in the screen illustrated in FIG. 7B, as illustrated in FIG. 7C, a screen for reading or scanning a two-dimensional code attached to the injector with a camera that is a non-contact sensor in accordance with the reading scheme is output to the terminal output interface 102. The two-dimensional code corresponds to a barcode and/or a character and symbol string as well as a QR code ("QR code" is registered trademark), and an RFID tag corresponds to the designated medium. Whether or not a unique identifier is read is determined in accordance with whether or not a worker near the work machine 200 scans the two-dimensional code attached to the component of the work machine 200 in accordance with the screen using the terminal device 100.

In a case where the determination result is negative (FIG. 6/STEP 132: No), a series of processing ends. On the other hand, in a case where the determination result is affirmative (FIG. 6/STEP 132: Yes), the second functional element 122 converts the two-dimensional code that is the unique identifier into a primary character string (FIG. 6/STEP 134).

Further, the second functional element 122 converts the primary character string into a secondary character string in accordance with a conversion scheme in accordance with the designated attributes (Xi, Yj) (FIG. 6/STEP 135). For example, a result of extracting part of the primary character string in accordance with the conversion scheme is generated as the secondary character string.

Then, the second functional element 122 causes the terminal device 100 to transmit a second external request signal to the first control unit 210 that is the real machine communication station with which wireless communication is established, in accordance with the designated communication format (FIG. 6/STEP 136). The second external request signal includes a second designation request regarding control characteristics and/or correction information of the component 222 in accordance with the secondary character string.

The first control unit 210 (real machine communication station) determines whether or not the second external request signal is received (FIG. 6/STEP 232). In a case where the determination result is negative (FIG. 6/STEP 230: No), a series of processing ends. On the other hand, in a case where the determination result is affirmative (FIG. 6/STEP 232: Yes), the first control unit 210 generates a second internal request signal by converting a format of the second external request signal into a format for communication in the real machine communication network. After that, the first control unit 210 transmits the second external request signal to the second control unit 220 through the real machine communication network (FIG. 6/STEP 234).

The second control unit 220 determines whether or not the second internal request signal is received (FIG. 6/STEP 432). In a case where the determination result is negative (FIG. 6/STEP 432: No), a series of processing ends. On the other hand, in a case where the determination result is affirmative (FIG. 6/STEP 432: Yes), the second control unit 220 further determines whether or not the second internal request signal includes a second designation request (FIG. 6/STEP 434). For example, the "second designation request" includes a request for a diagnostic result of the component 222 for which operation is controlled by the second control unit 220.

In a case where the determination result is negative (FIG. 6/STEP 434: No), a series of processing ends. On the other hand, in a case where the determination result is affirmative (FIG. 6/STEP 434: Yes), the second control unit 220 transmits a second internal response signal including a second designation response in response to the second designation request included in the second internal request signal to the first control unit 210 through the real machine communication network (FIG. 6/STEP 436). For example, the "second designation response" includes a result as to whether or not the second control unit 220 can correctly receive parameters to be applied to control of the component 222.

The first control unit 210 determines whether or not the second internal response signal is received (FIG. 6/STEP 236). In a case where the determination result is negative (FIG. 6/STEP 236: No), a series of processing ends. On the other hand, in a case where the determination result is affirmative (FIG. 6/STEP 236: Yes), the first control unit 210 generates a second external response signal by converting a format of the second internal response signal into a format for wireless communication with the terminal device 100.

After that, the first control unit 210 transmits the second external response signal to the terminal device 100 through the real machine communication network (FIG. 6/STEP 238).

The second functional element 122 determines whether or not the terminal device 100 receives the second external response signal including the second designation response (or the second external response signal received by the terminal device 100 includes the second designation response) (FIG. 6/STEP 137). In a case where the determination result is negative (FIG. 6/STEP 137: No), the second functional element 122 outputs a second error notification indicating that diagnosis of the component 222 (designated component) or acquisition of the diagnostic result ends in failure to the terminal output interface 102 (FIG. 6/STEP 138), and a series of processing ends. On the other hand, in a case where the determination result is affirmative (FIG. 6/STEP 137: Yes), the diagnostic result of the component 222 or the second designated component is output to the terminal output interface 102 (FIG. 6/STEP 139), and a series of processing ends.

Operation and Effects

According to the real machine diagnostic system 120 as another embodiment of the present invention that exerts the functions, the second external request signal based on the designated attribute regarding the designated work machine 200 designated through the terminal input interface 101 and the unique identifier read in a non-contact manner from the designated component 222 with a non-contact sensor mounted on the terminal device 100 is transmitted to the real machine communication station 210 mounted on the designated work machine 200 (see FIG. 6/STEP 130→. . . STEP 136). Then, the second external response signal representing information regarding the designated component 222 in response to the second external request signal is transmitted from the real machine communication station 210 to the terminal device 100, and the information as the diagnostic result of the designated component is output to the terminal output interface 102 (see FIG. 6/STEP 232→STEP 234→STEP 432→STEP 434→STEP 436→STEP 236→STEP 238→STEP 137→STEP 139).

This can improve user-friendliness when information regarding the designated component 222 (second designated component) mounted on the designated work machine 200 is input in a format intended by the user as work for changing control parameters of the designated work machine 200 having the designated attribute.

In the real machine diagnostic system, the second functional element preferably adjusts a reading scheme of the unique identifier by the non-contact sensor in accordance with the designated attribute.

According to the real machine diagnostic system having the configuration, the unique identifier can be read in a non-contact manner by the non-contact sensor only from the designated component appropriate in view of the designated attribute. In other words, a situation is avoided where the unique identifier is read in a non-contact manner by the non-contact sensor from the designated component inappropriate in view of the designated attribute. It is therefore possible to improve user-friendliness and efficiency when information regarding the designated component of a work machine is acquired in a form intended by a user.

In the real machine diagnostic system, the second functional element preferably converts the unique identifier into a primary character string, extracts part of the primary character string as a secondary character string using an extraction scheme in accordance with the designated attribute and transmits the external request signal in accordance with the secondary character string to a real machine communication station mounted on the designated work machine.

According to the real machine diagnostic system having the configuration, the unique identifier read in a non-contact manner from the designated component of the designated work machine by the non-contact sensor mounted on the terminal device is converted into the primary character string. Further, part of the primary character string is extracted as the secondary character string using the extraction scheme in accordance with the designated attribute of the designated work machine designated through the input interface of the terminal device. Further, the external request signal representing the secondary character string is received by the real machine communication station mounted on the work machine, and a diagnostic result of the designated component corresponding to the external request signal is acquired by the real machine communication station. Then, an external response signal representing the diagnostic result of the designated component is transmitted from the real machine communication station, and the diagnostic result of the designated component is output to an output interface of the terminal device.

In the real diagnostic system described above, the second functional element preferably transmits an external request signal based on a combination of a plurality of attribute items including an internal cause attribute item regarding an internal situation of the designated work machine and an external cause attribute item regarding an external situation of the designated work machine as the designated attribute, and the unique identifier, to the real machine communication station mounted on the designated work machine.

According to the real machine diagnostic system having the configuration, information regarding the designated component can be output to the output interface of the terminal device in accordance with the designated attribute regarding the internal cause attribute item and the external cause attribute item designated through the input interface of the terminal device and the unique identifier read out in a non-contact manner from the designated component.

In the real machine diagnostic system, the second functional element preferably causes a plurality of selection menus for allowing selection through the input interface of the terminal device from a plurality of attributes that are a plurality of options to be output to the output interface of the terminal device at the same time or sequentially for at least one of the attribute items.

According to the real machine diagnostic system having the configuration, it is possible to reduce trouble of the user for inputting a plurality of attributes regarding the work machine to the terminal device through the input interface, so that it is possible to improve user-friendliness upon diagnosis of a designated diagnostic item of the work machine.

A real machine diagnostic composite system of the present invention includes the real machine diagnostic system, and the real machine communication station, and the real machine communication station receives the external request signal from the real machine diagnostic system, generates an internal request signal by converting a format of the external request signal, transmits the internal request signal to a designated control unit mounted on the designated work machine for controlling operation of the designated component through a real machine communication network mounted on the designated work machine, receives an internal response signal in response to the internal request signal from the designated control unit through the real machine communication network, generates an external response signal by converting a format of the internal response signal, and transmits the external response signal to the real machine diagnostic system in accordance with the format.

According to the real machine diagnostic composite system having the configuration, the external request signal is transmitted to the real machine communication station mounted on the designated work machine. The external request signal is based on the designated attribute of the designated work machine and the unique identifier read out from the designated component of the designated work machine.

In accordance with this, information regarding the designated component of the designated work machine is acquired through communication in the real machine communication network between the real machine communication station and the designated control unit. Further, information regarding the designated component of the designated work machine is output to the output interface of the terminal device on the basis of the external response signal that is a result of converting the format of the internal response signal. This can improve user-friendliness when the user acquires information regarding the designated component as a diagnostic result of the designated work machine in an intended form using the terminal device having the wireless communication function.

REFERENCE SIGNS LIST

100 Terminal device
101 Terminal input interface
102 Terminal output interface
120 Real machine diagnostic system
121 First functional element (internal functional element)
122 Second functional element (external functional element)
200 Work machine
210 First control unit (real machine communication station)
220 Second control unit

The invention claimed is:

1. A real machine diagnostic system comprising:

one or more processors; and a memory storing computer-executable instructions that, when executed by the one or more processors, cause the real machine diagnostic system to function as a first functional element; and a second functional element, wherein the second functional element causes a terminal device to transmit an external request signal based on a combination of a plurality of attribute items regarding a designated work machine designated through an input interface of the terminal device and a unique identifier read in a non-contact manner from a designated component mounted on the designated work machine with a non-contact sensor mounted on the terminal device to a real machine communication station mounted on the designated work machine, the combination of a plurality of attribute items includes an internal cause attribute item regarding an internal situation of the designated work machine and an external cause attribute item which includes a region or country in which the work machine is located or environmental rule applied in the country or region, and causes the terminal device to receive from the real machine communication station an external response signal representing an application result of control characteristics regarding the designated component in response to the external request signal, and the first functional element causes the application result of the control characteristics of the designated component represented by the external response signal received by the terminal device to be output to an output interface of the terminal device.

2. The real machine diagnostic system according to claim 1, wherein the second functional element adjusts a reading scheme of the unique identifier by the non-contact sensor in accordance with the combination of a plurality of attribute items.

3. The real machine diagnostic system according to claim 1, wherein the second functional element converts the unique identifier into a primary character string, extracts part of the primary character string as a secondary character string using an extraction scheme in accordance with the combination of a plurality of attribute items and transmits the external request signal in accordance with the secondary character string to the real machine communication station mounted on the designated work machine.

4. The real machine diagnostic system according to claim 1, wherein the second functional element causes a selection menu for allowing selection of at least one option from the plurality of attribute items through the input interface of the terminal device as the combination of the plurality of attribute items to be output to the output interface of the terminal device.

5. A real machine diagnostic composite system comprising:

the real machine diagnostic system according to claim 1; and the real machine communication station, wherein the real machine communication station receives the external request signal from the real machine diagnostic system, generates an internal request signal by converting a format of the external request signal, transmits the internal request signal to a designated control unit mounted on the designated work machine for controlling operation of the designated component through a real machine communication network mounted on the designated work machine, receives an internal response signal in response to the internal request signal from the designated control unit through the real machine communication network, generates the external response signal by converting a format of the internal response signal, and transmits the external response signal to the real machine diagnostic system in accordance with the format.

6. A real machine diagnostic method to be executed by a terminal device comprising one or more processors and a memory storing computer-executable instructions, the real machine diagnostic method comprising:

transmitting an external request signal based on a combination of a plurality of attribute items regarding a designated work machine designated through an input interface of the terminal device and a unique identifier read in a non-contact manner from a designated component mounted on the designated work machine with a non-contact sensor mounted on the terminal device to a real machine communication station mounted on the designated work machine, the combination of the plurality of attribute items includes an internal cause attribute item regarding an internal situation of the designated work machine and an external cause attribute item which includes a region or country in which the work machine is located or environmental rule applied in the country or region;

receiving from the real machine communication station an external response signal representing an application result of control characteristics regarding the designated component in response to the external request signal; and outputting the application result of the control characteristics of the designated component represented by the external response signal received by the terminal device to an output interface of the terminal device.

* * * * *